US006185490B1

(12) United States Patent
Ferguson

(10) Patent No.: US 6,185,490 B1
(45) Date of Patent: Feb. 6, 2001

(54) VEHICLE CRASH DATA RECORDER

(76) Inventor: Thomas W. Ferguson, 54861 High Ridge Rd., Bellaire, OH (US) 43906

( * ) Notice: Under 35 U.S.C. 154(b), the term of this patent shall be extended for 0 days.

(21) Appl. No.: 09/270,639

(22) Filed: Mar. 15, 1999

(51) Int. Cl.[7] .................................................... G06F 19/00

(52) U.S. Cl. ................................................ 701/35; 369/21

(58) Field of Search ......................... 701/35, 45; 369/21; 340/436, 440

(56) References Cited

U.S. PATENT DOCUMENTS

| | | | | |
|---|---|---|---|---|
| 4,533,962 | | 8/1985 | Decker et al. . | |
| 4,638,289 | | 1/1987 | Zottnik . | |
| 4,866,616 | | 9/1989 | Takeuchi et al. . | |
| 4,992,943 | | 2/1991 | McKracken . | |
| 5,311,430 | | 5/1994 | Ishigami . | |
| 5,416,703 | * | 5/1995 | Gruler et al. | 701/1 |
| 5,430,432 | | 7/1995 | Camhi . | |
| 5,445,024 | * | 8/1995 | Riley, Jr. et al. | 73/489 |
| 5,446,659 | | 8/1995 | Yamawaki . | |
| 5,477,141 | * | 12/1995 | Nather et al. | 324/160 |
| 5,541,590 | | 7/1996 | Nishio . | |
| 5,581,464 | | 12/1996 | Woll et al. . | |
| 5,602,734 | * | 2/1997 | Kithil | 701/45 |
| 5,608,629 | | 3/1997 | Cuddihy et al. . | |
| 5,638,273 | * | 6/1997 | Coiner et al. | 701/35 |
| 5,815,093 | | 9/1998 | Kikinis . | |
| 6,006,148 | * | 12/1999 | Strong | 701/33 |

FOREIGN PATENT DOCUMENTS

| | | |
|---|---|---|
| 402039294 | 2/1990 | (JP) . |
| 404302077 | 10/1992 | (JP) . |
| 404338891 | 11/1992 | (JP) . |
| 363016223 | 1/1998 | (JP) . |

OTHER PUBLICATIONS

Fincham et al.; DRACO: a transient recorder for road accidents; Automotive Electronics; 1991; pp. 135–139.*

Fincham; Data recorders for accident investigation; IEE; Monitoring of Driver and Vehicle Performance; Apr. 1997; pp. 6/1–3.*

* cited by examiner

*Primary Examiner*—Michael J. Zanelli

(57) ABSTRACT

A vehicle data recorder useful in recording and accessing data from a vehicle accident comprised of; a microprocessor based system that will have in the preferred embodiment four inputs from the host vehicle, and four inputs from the internal sensors. The apparatus is arranged with a three-stage memory to record and retain the information and is equipped with a series and parallel connectors to provide instant on scene access to the accident data. This invention includes a plurality of internally mounted devices necessary to determine vehicle direction, rollover detection, and impact forces. The plurality of inputs from the host vehicle include in the preferred embodiment, the speed of the vehicle, seat belt use, brake activation, and whether or not the transmission is in forward or reverse gear.

8 Claims, 4 Drawing Sheets

FUNCTIONAL BLOCK DIAGRAM
CAR DATA RECORDER

FUNCTIONAL BLOCK DIAGRAM
CAR DATA RECORDER
POWER DISTRIBUTION

FUNCTIONAL BLOCK DIAGRAM
CAR DATA RECORDER
DATA DISTRIBUTION

FUNCTIONAL BLOCK DIAGRAM
CAR DATA RECORDER

LOGIC FLOWCHART
CAR DATA RECORDER

VEHICLE CRASH DATA RECORDER

FIELD OF THE INVENTION

This invention in general relates to vehicle data recorders. More specifically, the invention is a vehicle data recorder using microprocessor controlled electronics a two stage random access memory, and a non-volatile memory to retain the vehicle identification number and data on impact forces, brake activation, seat belt use, vehicle speed, vehicle direction, vehicle rollover, and the date and time of the incident.

BACKGROUND OF THE INVENTION

Prior Art

In 1997, the most recent year for which data is available, there were 6,764,000 police reported accidents according to the National Highway safety Board. These accidents caused an estimated $150,000,000,000.00 in economic losses and about 47,000 lives. This invention, hereinafter referred to as the Vehicle Data Recorder, or "VDR" is designed to save lives and money by providing instant access to critical information about a motor vehicle accident.

The VDR is unique because it is a self-contained modular unit easily installed on any motor vehicle. It will monitor and record data on eight data channels, three from internal event triggered sensors, one from an internal electronic compass, and four from the host vehicle. The data will be stored in memory in a time correlated file format which upon power interruption, will be transferred to permanent data storage, where it will be available for download to any Windows® based computer via a serial connection.

Consider the following example. A squad is called to the scene of a single car motor vehicle. The patient is unconscious and unable to tell the paramedics what happened. The paramedics would treat this patient for obvious visible life threatening injuries and transport him to the nearest trauma center. The trauma center would try to stabilize the patient and start test to determine the extent of the patient's injuries. With access to the type of information provided by this invention, you would know the vehicle identification number and that the vehicle was involved in a head on collision on Jun. 9, 1998 at 7:57:35 PM. You would know that the vehicle was traveling at 47.5 mph at the time of the 10 g collision and that the driver had swerved 30 degrees to his left and applied his brakes exactly 0.3 sec prior to the crash and that he had been wearing his seatbelt.

Instant access to this type of detailed information will allow EMS and subsequently hospital personnel to focus attention and resources upon the most serious and life threatening injuries. It will also start the clock on the "Golden Hour" with a time certain, thus encouraging a quicker decision for a load and go situation.

Medical personnel would not be the only group interested in this data. The following would have at least as much interest in this information as well.

1. Police.
2. Insurance Companies.
3. State and Federal Government agencies.
4. Automotive companies.

The foundation upon which all accident investigations is built is the written report compiled by the police officers at the scene. This report contains a variety of information, some of it based upon observation, such as, road and weather conditions, or hazardous environmental or construction obstacles that might have contributed to the accident. The balance of the report is comprised of estimation, hearsay, or calculation, I.E. the speed of the vehicle, was the seatbelt fastened, how hard and where was the initial impact, and did a rollover occur.

The availability of an electronic accident report coded with the vehicle identification number for vehicle identification and containing precise information about a motor vehicle accident would allow the insurance companies to create a more accurate database from which actuarial calculations could be made. More accurate calculations would lead to a more equitable distribution of risk and therefore rates could be based upon car and driver records that would be more accurate then anything currently available. Government involvement in highway safety has always had the dual aim of saving lives, and reducing the enormous economic losses attributed to motor vehicle accidents. To this end they have maintained a data base on all motor vehicle accidents reported to them by the police. The electronic accident report will provide precise information from which to build a data base.

Vehicle data recorders have been the subject of earlier patents and often they have included inputs from brake pedal travel, accelerator position, turn signals, headlights, acceleration forces, and some have even included video inputs. Most vehicle data recorders, however, have concentrated on a static laboratory environment and staged accidents using specifically designed test vehicles. Data collection devices used on these test vehicles are expensive and sophisticated. Some of these devices include:

1. Gyroscopic devices.
2. Laser devices.
3. Video cameras.
4. Impact sensors.
5. Accelerometers.

The advantages and disadvantages of these devices in a real-world environment are as follows. Gyroscopic devices have proved themselves to be effective and accurate in a laboratory test vehicle, and in aircraft inertial navigation systems. They are, however, expensive, require a relatively long warm up period before stabilization can occur, and they consume a relatively large amount of power. In fact the power consumption of a gyroscopic device would require a complete re-design of the typical motor vehicle electrical system. Lasers also consume large amounts of power and are limited to being a reference from which to measure vehicle distortion after an impact. Video cameras, are now being used in some vehicles as stand alone data collection devices, but the cameras focus will always be on the outside events. Specialized impact sensors, and accelerometers fall into the same broad category. They each have a function in a staged accident, but are not of any beneficial use in the real world unless coupled with a more encompassing system like the Vehicle Data Recorder.

Aviation has developed data collection devices that are unique to the demanding aspects of aviation. Flight Data Recorders have proved invaluable to the National Transportation and Safety Board when they had to investigate accidents. The unique and challenging nature of flight, and the tremendous forces that occur in an airplane crash, have contributed to the development of a very sophisticated recorder that is coupled to all essential operating systems in an aircraft that will withstand the tremendous forces of an airplane crash. The system is very expensive, in fact is so expensive that it is not even used in private aircraft Several real world events and advances in technology first led me to conceive of the Vehicle Data Recorder. The three events are the car crash that killed princess Di, and the inability of the police to determine exactly what happened. An airplane crashed in Okinawa, and I was on an emergency call to an automobile accident where the hospital ask me a series of questions about the accident to try to determine the mechanism of injury. The technological advances in computer hardware, specifically faster and cheaper microprocessors, and the larger capacity storage devices developed within the past two years led me to believe that they might be utilized in such a way as to answer my questions about mechanism of injury.

The purpose of the Vehicle Data Recorder, therefore is to provide an economical and reliable means to collect essential real world data about how a vehicle behaves during an accident. Following is a summary of relevant vehicle data recorder patents.

1. Decker et al U.S. Pat. No. 4,533,962.

A method and apparatus for sensing and recording diverse operational and performance characteristics of automotive vehicles and the like has a plurality of transducers directly associated with different mechanical functions of the vehicle for sensing their operating characteristics in relation to time as well as generating analog signals representative of certain functions and combining them with digital signals representing other functions. A signal converter encodes signals from the transducers in predetermined order into digital data signals. Each succession of signals generated are temporarily stored. A recorder than records information stored serially and enables ready access to and identification of each event or condition. After recordation of information over a selected time interval, the recording is automatically erased as additional information is transmitted to the recorder to provide a current history over limited time intervals, such as 30 minutes so as to be especially useful in accident analysis.

The Decker recorder provides a method for sensing and recording numerous operational and performance characteristics of a host vehicle. The Decker system is based on the placement of numerous transducers throughout the host vehicle and associating the electromechanical output of the transducer with the specific vehicle system such as brake pedal travel, and wheel rotation to determine speed. The recorder portion of the system writes to a continuous tape loop descrete blocks of data representing vehicle operation.

2. Zottnik, U.S. Pat. No. 4,638,289

An accident data recorder for short-time recordation and storage of data and events relating to an accident of motor vehicles, comprising pickups for sensing, for example, wheel revolutions to determine the traveled distance and speed of the vehicle. In addition to these wheel sensors, capacitance-based acceleration sensors are provided whose output signals along with the output signals of the wheel sensors and with other status data relating to the operation of the vehicle, are continuously recorded at storage locations of a fixed storage. For this purpose, an addressing logic is provided which operates in a closed counting loop and, as soon as a final address is reached jumps back to the starting address to overwrite the initially stored data. The cyclic data storage is interrupted by the occurrence of a trigger event defining an accident, with the result that the last recorded data, including a predetermined after-travel time, are frozen.

The Zottnik device is basically a short duration recorder that receives input from various sensors located around the host vehicle and uses an addressing logic which operates in a closed counting loop to store data until the final address is reached, at which time it jumps back to the beginning and writes over the previously stored data. When a trigger event occurs such as a vehicle accident the data in storage is permanently stored for later analysis.

3. Takeuchi et al U.S. Pat. No. 4,866,616

Vehicle information such as vehicle speed, engine rotation speed when a vehicle runs are collected and converted into numerical data every constant period of time and these numerical data are written and recorded into memory module. The memory module has therein a non-volatile memory and is detachably provided to a write unit attached to the vehicle. The data writing and power supply to the memory module from the write unit are executed by the contactless coupling using induction coils.

The Takeuchi recorder concentrates on inputs such as vehicle speed and engine rotation and is thus able to concentrate on information as it relates to drive times, drive distances, vehicle speed, and engine rotation. The information is gathered from using electromagnetic induction coils to sense the desired information and relay it to the module where it is recorded into memory.

4. McCracken U.S. Pat. No. 4,992,943

An invention which facilitates motor vehicle accident reconstruction by providing apparatus for detecting and storing data describing the status of a motor vehicle when it is involved in a collision. The invention includes a plurality of impact detectors, a microprocessor which obtains vehicle status data from the computer systems used in modern vehicles, and a memory, such as an EPROM, for storing data for later retrieval.

The McCraken recorder uses the vehicles onboard computer as its' source of data. The obtained data is not stored in memory until one of the many impact sensors located throughout the host vehicle triggers and event. The vehicle status is then stored in an EPROM non-volatile memory for later retrieval and analysis. The chief failing of the Mckracken system is in the used of imbedded microprocessors, which only allow for limited program instructions and an EPROM memory which is essentially a one time recording device until reset by other programming devices.

5. Other patents considered relevant are contained in the appendix:

| | |
|---|---|
| 1. Ishigami | patent#5,311,430 |
| 2. Camhi et al. | patent#5,430,432 |
| 3. Yamawaki | patent#5,446,659 |
| 4. Nishio | patent#5,541,590 |
| 5. Woll et al. | patent#5,581,464 |
| 6. Cuddihy et al. | patent#5,608,629 |
| 7. Kikinis | patent#5,815,093 |

None of these devices, however, do an adequate job of provided relevant information as it relates to a vehicle accident in a comprehensive self contained cost effective modular format. Neither do any of the prior inventions provide an electronic means of vehicle identification, or a real world date and time of accident system. The prior inventions also fail to provide a means of instant on scene access to the stored data in a non-destructive way. The prior inventions also fail to provide for an internal backup rechargeable battery power source necessary to prevent loss of data prior to transfer to the non-volatile memory.

SUMMARY OF THE INVENTION

It is therefore an object of this invention to provide for a novel and improved method and means for measuring and recording vehicle performance characteristics.

It is a further object of this invention to provide a novel and improved cost effective method and means of measuring and recording vehicle status prior to, during, and subsequent to a trigger event, which will be accurate and reliable, easy to install, and can be retrofitted to existing vehicles.

It is a further object of this invention to provide a novel and improved self-contained rechargeable power source for the purpose of completing the file routine and transferring same to a non-volatile memory device if a power interruption occurs either through cessation of vehicle operation by operator action or the occurrence of a trigger event that disrupts the vehicle electrical system.

It is another object of this invention to provide a novel and improved method and means of determining vehicle direction at all times.

It is a further object of this invention to provide a novel and improved method and means of correlating all descrete events in relation to actual date and time of occurrence and recording same.

Another object of this invention is to provide a novel and improved method and means of identifying and storing vehicle specific data files by correlating and incorporating the vehicle identification number in all files.

Another object of this invention is to provide for a novel and improved method and means of identifying either a side to side, or front to back vehicle rollover through the coordinating and comparing the data from the tilt meter and the electronic compass. A side to side rollover would be indicated by activation of the tilt meter without significant change in the compass heading readings. A front to back rollover would be indicated by activation of the tilt meter coupled with a 180 degree compass flip.

BRIEF DESCRIPTION OF THE DRAWINGS

This invention can be understood and is described in greater detail by reference to and in connection with the accompanying drawings.

DETAILED DESCRIPTION OF THE INVENTION

Figure 1:
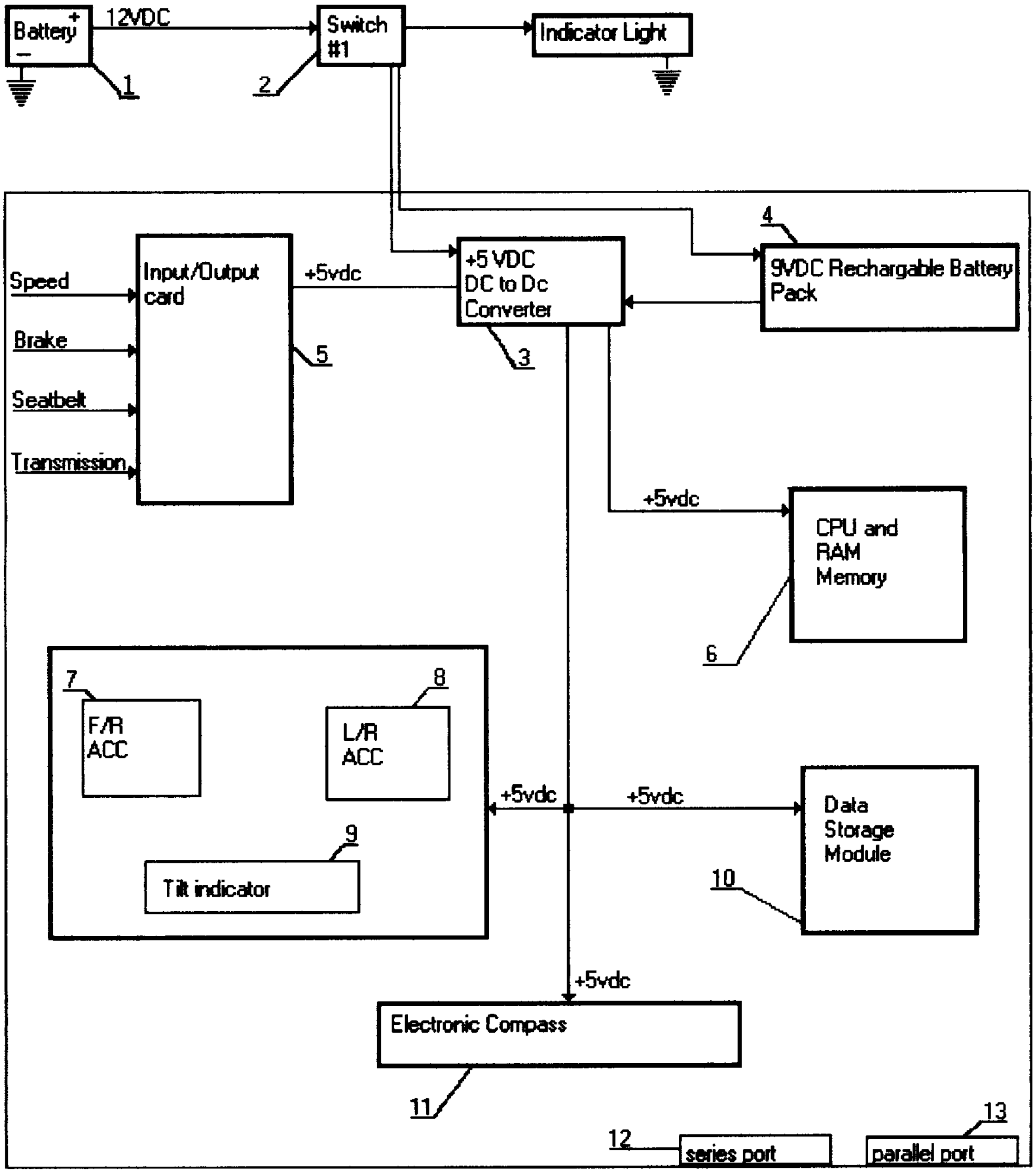
FIG. 1 is a functional block diagram showing one embodiment of a vehicle data recorder's power distribution.
Figure 2:
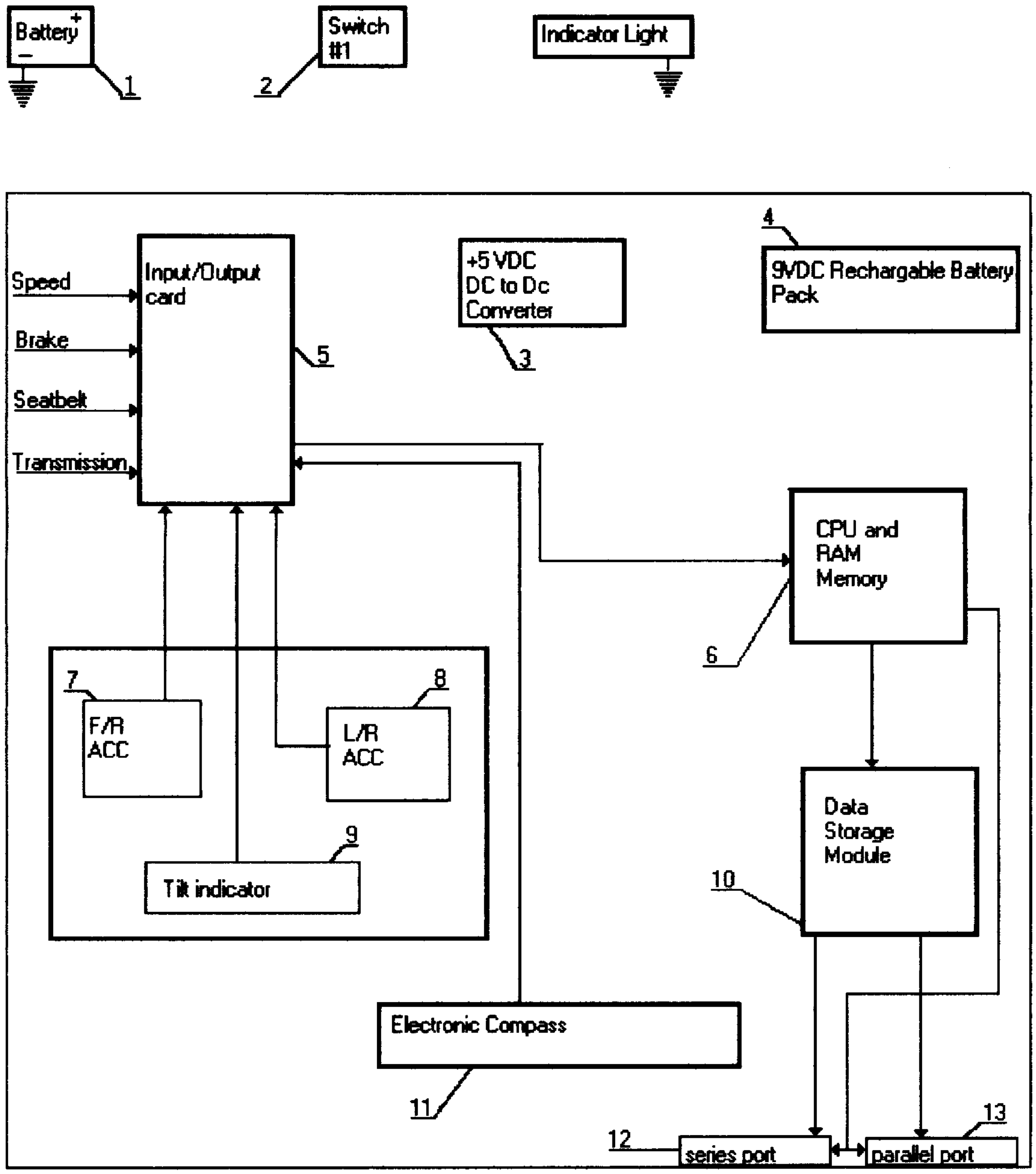
FIG. 2 is a functional block diagram showing one embodiment of a vehicle data recorder's logic and data flow.

The vehicle data recorder hereinafter referred to as the "VDR" will monitor four operational inputs from the vehicle and four event triggered inputs contained in the modular unit on eight data channels. All data channels will interface with CPU 6 through the I/O card 5

1. Data channel one 18 will monitor the transmission. If the transmission is in park, a 0 volt state, the system will stay in standby and not record any data. If the transmission is in reverse, the system will go into a record data mode and sample the vehicle speed times a negative 1 multiplier. If the transmission is in a forward gear, the system will go into a record data mode and sample vehicle speed without the negative multiplier. The transmission monitor will consist of an electrical connection to the indicator lights located on the drivers instrument array. Park will be indicated by a negative voltage, reverse by a positive voltage, and all other gears by a zero voltage state. In this manner, the system will know whether to be in stand-by, apply the negative multiplier to the vehicle speed, and simply record the speed data as read.
2. Data channel two will be connected to the speedometer.15
3. Data channel three will be connected to the seatbelt indicator light.17 When the seatbelt is not fastened, the indicator will provide a positive voltage to the data channel. When the seatbelts are fastened, the light will be out and no voltage will be supplied to the data channel.
4. Data channel four will be connected to the brake lights. 16 When the brake is applied, a positive voltage will be supplied to the data channel. When brakes are not used there is no voltage supplied to the data channel.
5. Data channel five is connected to an internal accelerometer7 oriented to the front and rear of the vehicle. This accelerometer can register a +/−50 gravity impact on an analog scale.
6. Data channel six is connected to an accelerometer 8 oriented to the right and left of the vehicle. This accelerometer can register a +/−50 gravity impact on an analog scale.
7. Data channel seven is an internally mounted normally open tilt meter9 that closes only after reaching or exceeding a 90 degree platform tilt.
8. Data channel eight is connected to an internally mounted electronic compass11 that provides a constant analog input to indicate the direction of the vehicle.

The data collected will be interfaced with the system through an internal input/output card 5 that will transfer the data to the central processing unit 6 where it will then be recorded to active memory. The active memory will be capable of recording at least 20 minutes of vehicle operation. When the active memory reads full, the cpu 6 will create a unique file based upon the date and time as supplied by the system clock, and transfer that file to a non volatile cache memory, erase the active memory and begin recording new data. When a power interruption occurs for any reason, or the vehicle transmission is placed in park, or an impact or rollover occurs the system will record data for an additional 30 seconds, then the cpu6 will create a unique file based upon the date, time, and vehicle identification number and transfer that file containing all pertinent data to permanent memory10 where it will be available for download. To accomplish the data transfer, the system is provided with a battery backup.4

Theory of Operation

Figure 4:
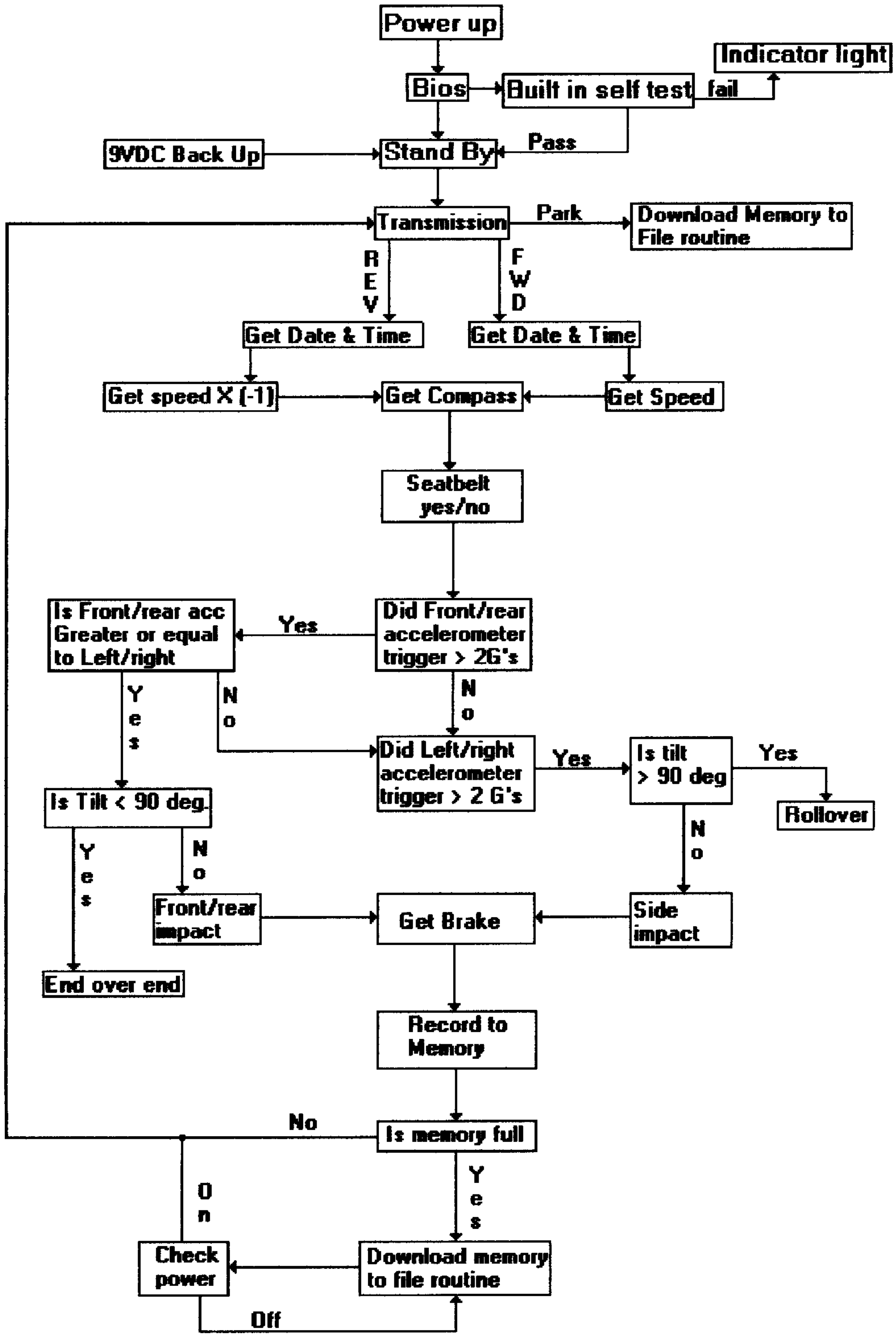
FIG. 4 is an operational flow chart showing one embodiment of a vehicle data recorders sequence of operation.

The operational sequence of the VDR can best be understood by reference too and in connection with the logic flow chart provided in FIG. 4.

When the vehicle is started, 12VDC 1 is supplied to the VDR through the vehicle ignition 2 to both the DC to DC converter 3 and the battery charger 4. The DC to DC converter changes the 12VDC from the vehicles electrical system to a regulated 5VDC and distributes the power throughout the system. The system BIOS contained in the boot section of the CPU 6 performs a series of built in self tests to insure that the system is working. If the system fails any of these tests, an indicator light14 will be illuminated on the vehicle dashboard as a visual reminder for service.

Figure 3:
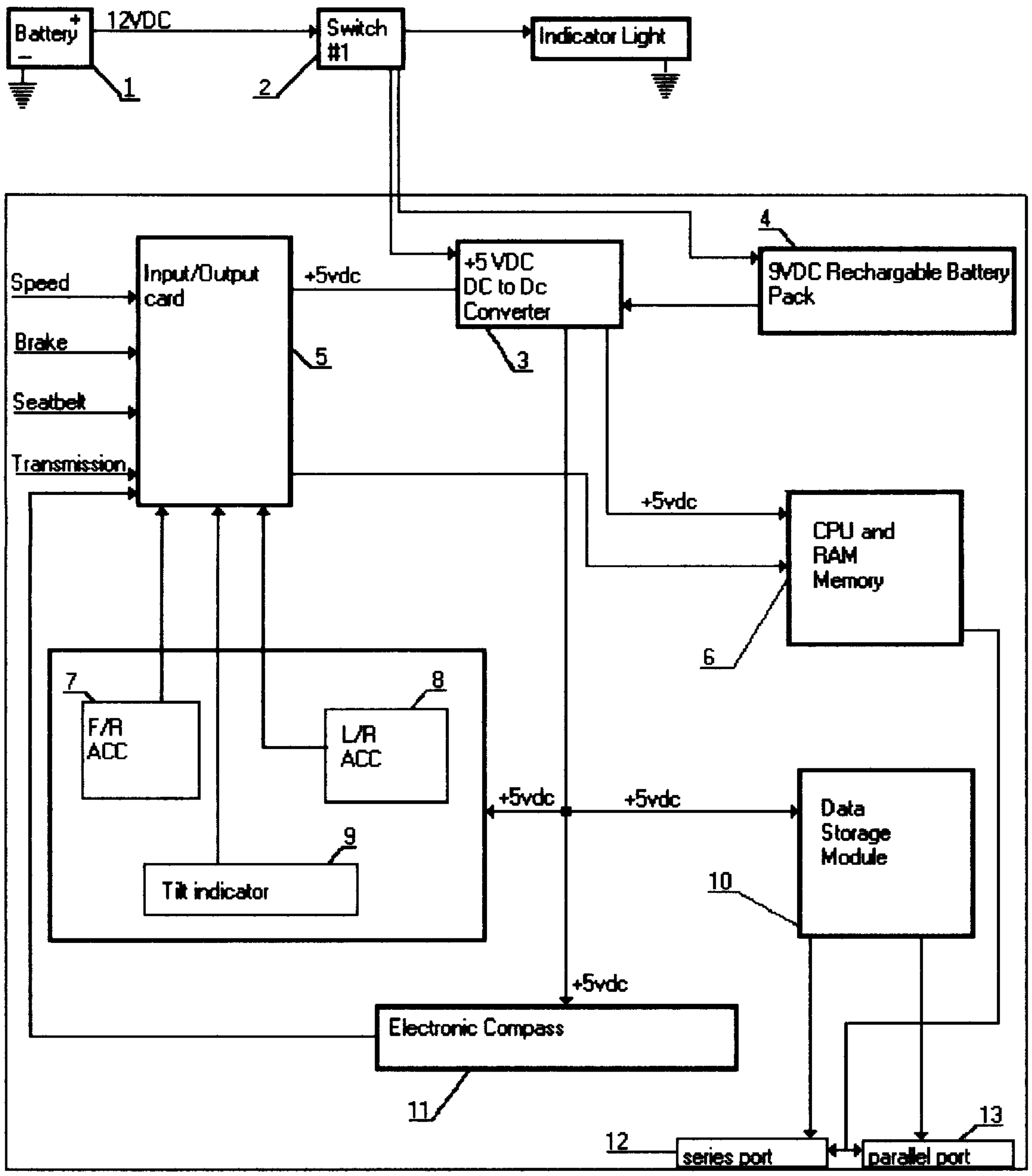
FIG. 3 is a combination functional block diagram showing both power distribution and data flow.

After successful completion of the self test, the VDR will enter a standby state until the vehicle is taken out of park If the vehicle is in a reverse gear, the speed will be recorded as a negative number. If the transmission is in any of the forward gears or neutral, the system will record a positive speed. When the vehicle is placed in gear, The VDR Will 1. Inquire and record the time and date.
2. Check and record the speedometer using a negative multiplier if required.
3. Check and record the vehicle direction.
4. Check and record the seatbelt indicator.
5. Check if the front/rear accelerometer has triggered an impact greater then the specified threshold level. If yes, the system will compare the recordings of the front/rear accelerometer to the left/right accelerometer. If the front/rear accelerometer has an impact greater then the left/right accelerometer, the VDR will check to see if the tilt meter has recorded an event greater than 90 degrees.
6. If the front/rear accelerometer has not triggered, the VDR will sample the left/right accelerometer and make the same comparisons. The logic loop, as illustrated in the FIG. 3, explains how the VDR decides what type of event has occurred.
7. Check and record the brake.
8. Write to memory. If memory is full, download file to memory routine.
9. Check power and transmission. If in park or ignition is turned off the VDR will download the active memory to the file routine.
10. Start over.

From the foregoing, it will be greatly appreciated that a novel and improved inexpensive self-contained vehicle data recorder has been devised wherein the magnitude and direction of the kinetic forces that act upon a vehicle during the occurrence of an accident can be recorded to memory and accessed at the scene of that accident by downloading the stored data to a hand-held or portable computing device for the beneficial use of the vehicle passengers and/or rescue personnel. These forces and measurements include but are not limited to the speed of the vehicle, the direction of the vehicle, the angular forces that result from either a side or front or rear impact, the deceleration forces (g-forces) that result from said impact, the brake activation, seat belt use and the centrifugal forces that result from either a rollover or spin. Instant access to this vital information allows EMS personnel to provide a more focused exam and treatment of accident victims while preserving the information coded with the, Date and Time of the accident and the vehicle identification number for the police report and the subsequent analysis of the accident. It should be understood that transmission of the electronic accident report to and collection by the state and federal agencies would provide a comprehensive data base on vehicle accidents that could be used as the basis for devising better and safer vehicles. We would know for instance the exact time of day that most accidents occur. This would be helpful in allocating police, EMS, and medical manpower in a more cost effective way. We would know the exact speed at which most accidents occur, we would have a permanent vehicle accident record that would be available to anyone with access to the Internet.

It is therefore to be understood that various modifications and changes may be made in the method and means and apparatus of the present invention, as well as its' intended application and use without departing from the spirit and scope of the present invention as defined by the following claims.

I claim:

1. A self-contained apparatus to be installed upon motor vehicles for detecting and recording vehicle operating systems data and vehicle response to kinetic forces that act upon the vehicle during an accident trigger event, comprising:

a plurality of electrical connections for collecting pertinent data on vehicle systems, said data including speed of the vehicle, seat belt use, forward or reverse gear status and brake activation, said data being in part analog and in part digital; and a multistage memory scheme for storing collected vehicle data, the memory scheme including a short term active memory capable of retaining a short time segment of collected data, a second stage cache memory to temporarily store data transferred from the active memory to prevent overwriting of data stored in the active memory and a non-volatile memory capable of permanently storing data for periods of at least 30 days.

2. The self-contained apparatus of claim 1, wherein said apparatus further comprises:

a rechargeable back-up battery system for enabling the transfer of data recorded in active and cache memory to permanent memory in the event of an interruption of electrical power resulting from of any one of an occurrence of an accident trigger event and operator action.

3. The self-contained apparatus of claim 1, further comprising:

means for transferring the data stored in permanent memory to a hand-held or portable computing device.

4. A self-contained apparatus for detecting and recording kinetic forces that act upon the vehicle during an accident trigger event, comprising:

an electronic compass for providing a vehicle heading;

a normally open tilt meter which closes only after the vehicle reaches or exceeds a 90 degree tilt; and a processing means, coupled to the compass and tilt meter, for discriminating any one of a front to back rollover, a side to side rollover and a vehicle spin.

5. The self-contained apparatus of claim 4, wherein:

a. a front to back rollover being indicated by activation of the tilt meter with a corresponding 180 degree change in vehicle heading;

b. a side to side rollover being indicated by activation of the tilt meter without a corresponding change in vehicle heading; and c. a vehicle spin being indicated by a rapid change in vehicle heading without activation of the tilt meter.

6. A method for detecting and recording vehicle operating systems data and vehicle response to kinetic forces that act upon the vehicle during an accident trigger event, comprising:

collecting pertinent data on vehicle systems through a plurality of electrical connections, said data including speed of the vehicle, seat belt use, forward or reverse gear status and brake activation, said data being in part analog and in part digital; and storing collected vehicle data in a multistage memory scheme, the memory scheme including a short term active memory capable of retaining a short time segment of collected data, a second stage cache memory to temporarily store data transferred from the active memory to prevent overwriting of data stored in the active memory and a non-volatile memory capable of permanently storing data for periods of at least 30 days.

7. The method of claim 6, further comprising:

transferring data recorded in active and cache memory to permanent memory in the event of an interruption of electrical power resulting from of any one of an occurrence of an accident trigger event and operator action.

8. The method of claim 6, further comprising:

transferring the data stored in permanent memory to a hand-held or portable computing device.

* * * * *